(12) United States Patent
Cabak (10) Patent No.: US 8,567,649 B1
(45) Date of Patent: Oct. 29, 2013

(54) EYEWEAR HOLDER FOR A SUN VISOR

(76) Inventor: Allan M. Cabak, Hawkins, WI (US)

( * ) Notice: Subject to any disclaimer, the term of this patent is extended or adjusted under 35 U.S.C. 154(b) by 243 days.

(21) Appl. No.: 13/069,787

(22) Filed: Mar. 23, 2011

Related U.S. Application Data (63) Continuation-in-part of application No. 11/805,697, filed on May 24, 2007, now abandoned.

(51) Int. Cl.
*B60R 7/05* (2006.01)

(52) U.S. Cl.
USPC ............. 224/312; 206/5; 206/459.1; 24/3.3; 248/902

(58) Field of Classification Search
USPC ............. 206/459.1, 5, 6; 224/312, 247, 269; 24/3.3; 362/155; 248/902; 381/122; 340/571
See application file for complete search history.

(56) References Cited

U.S. PATENT DOCUMENTS

| | | | |
|---|---|---|---|
| 3,016,262 A | 1/1962 | Hunt | |
| 4,941,634 A | 7/1990 | Gomes et al. | |
| 5,082,225 A | 1/1992 | Nespoli | |
| 5,195,668 A | 3/1993 | Kunes et al. | |
| 5,329,433 A * | 7/1994 | Geeting et al. | 362/154 |
| 5,372,345 A | 12/1994 | Schmidt | |
| 5,387,108 A * | 2/1995 | Crowell | 434/319 |
| 5,573,217 A | 11/1996 | Garvey et al. | |
| 5,575,383 A * | 11/1996 | Seeley | 206/217 |
| D391,919 S | 3/1998 | Brassard | |
| 5,762,194 A * | 6/1998 | Clegg | 206/449 |
| 5,966,783 A | 10/1999 | Genereux et al. | |
| 6,158,588 A * | 12/2000 | Conti | 206/457 |
| 6,210,003 B1 | 4/2001 | Chan | |
| 6,347,706 B1 * | 2/2002 | D'Ambrosio | 206/541 |
| D471,709 S | 3/2003 | Coyne | |
| 6,728,995 B2 * | 5/2004 | Ainley et al. | 24/3.3 |
| 6,881,273 B1 * | 4/2005 | Oberman | 134/6 |
| 6,883,989 B2 * | 4/2005 | Kushner et al. | 401/125 |
| 7,331,554 B2 * | 2/2008 | Cheng | 248/316.7 |
| 7,556,232 B1 * | 7/2009 | Begg | 248/316.7 |
| 2005/0128738 A1 * | 6/2005 | Parker et al. | 362/184 |
| 2009/0200183 A1 * | 8/2009 | Dussin | 206/6.1 |

\* cited by examiner

*Primary Examiner* — Nathan J Newhouse
*Assistant Examiner* — Phillip Schmidt
(74) *Attorney, Agent, or Firm* — Montgomery Patent & Design; Robert C. Montgomery (57) ABSTRACT

A holder for eyewear which removably attaches to a standard sun visor within a motor vehicle, comprises a spring clip releasably attachable to the sun visor, further having a decorative vehicle motif enclosure to clamp and secure the eyewear between protective pads. The vehicle motif comprises an upper and lower portion hingedly attached and latched to each other. The holder further comprises enhancements including the capability to broadcast pre-recorded audible sounds or messages, an integral flashlight, and a spray nozzle which propels a stream of a cleansing fluid. The holder may be introduced having different vehicle motif embodiments, such as a big rig, a truck, an automobile, or the like.

18 Claims, 12 Drawing Sheets

EYEWEAR HOLDER FOR A SUN VISOR

RELATED APPLICATIONS

The present invention is a Continuation-in-Part of and claims the benefit of U.S. application Ser. No. 11/805,697, filed May 24, 2007 now abandoned, the entire disclosures of which are incorporated herein by reference.

FIELD OF THE INVENTION

The present invention relates generally to an apparatus and method by which eye glasses may be stored in a vehicle, and more particularly, to a stylized eye glass holder that releasably attaches by a clip to a standard sun visor.

BACKGROUND OF THE INVENTION

It has been observed that drivers of motor vehicles from automobiles to tractor trailers have need of, and regularly use, sun glasses when bright or glaring conditions are present Likewise, at dusk, at night and on cloudy days, wearing sunglasses are not recommended or desired by vehicle operator. Therefore, it is readily apparent that a need exists for the convenient storage of sunglasses when not use as well as the ability to quickly retrieve sun glasses when conditions warrant. It is further observed that the sun visor is common to virtually every motor vehicle and would be an ideal location for an eye glasses storage device. A further observation is that many motorists select decorative, yet functional, products for use in their vehicles. The apparatus herein disclosed fulfills the needs as identified.

Several attempts have been made in the past to design an eyeglass holder that protects eyeglasses in an aesthetically pleasing manner. U.S. Pat. No. 5,082,225 in the name of Nespoli discloses an apparatus for securing sunglasses and driving glasses to a sun visor. The apparatus has an "S"-shaped body including a clip which protrudes at an upward angle from the body to resiliently bias the clip closely to the body. The bow at the end of the clip is adapted to accept both the temples and the bridges of various sizes and styles of sunglasses and driving glasses. The leg is the bottom extension of the body and is adapted to support either the temples or the bridge of the sunglasses or driving glasses. The leg supports the temples and prevents them from hanging down and obscuring the driver's vision. Also a clamp at the top of the body is provided to mount the apparatus to sun visors. The apparatus is injection molded with a pliant plastic material which will not scratch or misform either sunglasses or driving glasses. Unfortunately, this prior art example is plain in design and provides no means for cleaning eyeglasses.

U.S. Pat. No. 5,966,783 in the name of Genereux discloses a clasp-like device for securing sunglasses or other articles to sun visors or other acceptable surfaces. This is accomplished by installing the sunglass temples between one of the device jaws and the sun visor. The device is opened by applying pressure to a lever that is located near the intersection of the device jaws. On the inner surface of a device jaw, nubs can be placed, if required, to aid in the securing of sunglasses or other articles in position. The device can also be held in position by a device retainer which can be mounted where there are unacceptable surfaces by using two-faced adhesive or a screw. The device is made of injection molded glass reinforced nylon or similar material for holding tension. Unfortunately, this prior art example is plain in design and provides no means for cleaning eyeglasses.

U.S. Pat. No. 6,210,003 in the name of Chan describes an eyeglass clip device which includes a convex cover member, a concave base member and an elastic clip. The convex cover member and the concave base member are respectively provided with a foam-rubber cushion in the inner room, and they are pivotally assembled by a pin penetrating their pivotal ears at the rear ends. The elastic clip is secured to the concave base member with its two front hooked ends being inserted in the slot of the concave base member and its rear clamping portion being against the rear bottom surface of the concave base member. The top front end of the convex cover member is provided with a flanged catching element to be caught in the pressing block of the concave base member. After the elastic clip is secured to an article by clamping, the pressing block is pressed outward to release the flanged catching element, and the convex cover member will be ejected to separate from the concave base member for two folded temples of a pair of eyeglasses to be placed between the foam-rubber cushions of the convex cover member and the concave base member. The convex cover member is then pressed down again to make the flanged catching element be caught in the pressing block of the concave base member so as to firmly clamp and protect the pair eyeglasses. Unfortunately, this prior art example is plain in design and provides no means for lighting the interior of a vehicle.

None of the prior art particularly describes a sun visor eyeglass holder, fashionably designed, that releasably attaches to a standard sun visor and provides a variety of functions which both entertain the user and complimentarily augment the use of the eyeglasses. Accordingly, there is a need for a sun visor eyeglass holder in order to overcome the above noted shortcomings. The present invention is simple to use, inexpensive, fashionably designed, and may be stored in a vehicle by clipping to a standard sun visor.

SUMMARY OF THE INVENTION

In view of the foregoing disadvantages inherent in the prior art, it has been observed that there is need for an apparatus and method by which eye glasses may be stored in a vehicle, and more particularly, to a stylized eye glass holder that provides a variety of functions which both entertain the user and complimentarily augment the use of the eyeglasses. Thus, the object of the present invention is to solve the aforementioned disadvantages and provide for this need.

To achieve the above objectives, it is an object of the present invention to provide an aesthetically stylized device which holds and secures eyewear, such as sunglasses, within a vehicle for quick access when need. The device comprises a padded clam-shell style clamping mechanism which engages and retains the temple portions of a pair of eyeglasses. The device further includes a spring clip fastener adapted to fasten to a vehicle sun visor or similar structure.

Another object of the present invention is to comprise a vehicle motif which provides aesthetic benefits, indicates the propensity for use within a vehicle and which comprises the functional components of the device. In a preferred embodiment, the vehicle motif comprises a race car motif. In at least a first and a second alternate embodiment, the vehicle motif comprises an SUV motif and a tanker truck motif, respectively.

Yet still another object of the present invention is to protect the electrical and electronic portions of the device behind the cushioning members of the device. These portions include a circuit board and a speaker. The cushioning member adjacent the speaker preferably includes a plurality of molded-in speaker apertures to allow efficient transmission of sound from the speaker.

Yet still another object of the present invention is to provide selective illumination, allowing the device to function in a manner similar to a flashlight. The headlight portions of the vehicle motif include at least one (1) lamp which can be turned on and off by the user using a push-button style lamp switch located between front wheels of the vehicle motif.

Yet still another object of the present invention is to provide a replaceable battery which powers the lamp, speakers, and circuit board such that the device can be utilized in a portable manner without connection to an external power source.

Yet still another object of the present invention is to facilitate cleaning of the eyeglass lenses by including an integral reservoir and nozzle containing a volume of a lens cleansing fluid within a trunk portion of the vehicle motif. When the device is in place, the user can press a spray button to compress the reservoir and force the fluid downwardly through the nozzle to spray the fluid onto the eyewear. The device also includes a fill cap for refilling the reservoir as needed.

Yet still another object of the present invention is to provide entertainment during use by automatically playing sounds when the clamping mechanism is released by the user. The clamping mechanism is released by pressing inwardly on the front wheels of the vehicle motif, which releases a pair of latching arms. This in turn depresses a sound switch located between the front wheels and causes a sound to be emitted from the speakers.

Yet still another object of the present invention is to enable use of both pre-recorded sounds and user-recorded sounds. The circuit board can contain pre-recorded sounds which are played back upon actuation of the sound switch. Furthermore, the device includes a record switch and a microphone which enable a user to record a desired sound onto digital memory of the circuit board such that releasing the clamping mechanism automatically plays back the user-recorded sound, as described above.

Yet still another object of the present invention is to enable a plurality of alternate attaching features in lieu of or in addition to the spring clip, including a permanent magnet, a metal or plastic hook, or a plastic or fabric loop. These alternate attaching features can be utilized to securely attach the device to additional surface or structures such as refrigerators, doorknobs, walls, or the like.

Yet still another object of the present invention is to provide a method of utilizing the device that provides a unique means of procuring a model of the device, attaching the device to a sun visor or other desired location, pressing both front wheels inwardly to release the latching arms, thereby opening the device and automatically broadcasting a pre-recorded message from the speakers, inserting eyewear between the cushioning members, latching the device and securing the eyewear until needed for use; and benefiting from attractive and protective securement of the eyewear.

Yet still another object of the present invention is to provide a method of utilizing the lamp(s) as a flashlight by pressing and releasing the lamp switch. The lens spray nozzle can be utilized to cleanse the lenses by depressing the spray button and expelling a stream of cleansing fluid from the nozzle onto the eyewear.

Yet still another object of the present invention is to provide a method of recording a personal audio message by manually pressing and holding the record switch to initiate a recording interval, speaking into the microphone, and releasing the record switch to end the recording process.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

| DESCRIPTIVE KEY | |
|---|---|
| 10 | eyewear holder |
| 11 | first lower appendage |
| 12 | first upper appendage |
| 13 | chassis |
| 14 | first lower cushioning member |
| 15 | first upper cushioning member |
| 16 | rear wheel |
| 17 | front wheel |
| 18 | first pivot/hinge |
| 20 | circuit board |
| 21 | battery/holder |
| 23 | microphone |
| 25 | speaker aperture |
| 26 | sound switch |
| 28 | record switch |
| 29 | speaker bracket |
| 30 | lamp |

-continued

| DESCRIPTIVE KEY | |
|---|---|
| 31 | illumination |
| 32 | lamp switch |
| 33 | latching arm |
| 34 | latching feature |
| 37 | first speaker |
| 38 | second speaker |
| 40 | spring clip fastener |
| 41 | magnetic attachment |
| 42 | hook attachment |
| 43 | loop attachment |
| 44 | connector |
| 49 | fastener |
| 52 | nozzle |
| 53 | spray button |
| 54 | fill cap |
| 55 | cleansing fluid |
| 56 | reservoir |
| 60 | vehicle |
| 65 | visor |
| 70 | eyewear |
| 100 | SUV embodiment |
| 111 | second lower appendage |
| 112 | second upper appendage |
| 114 | second upper cushioning member |
| 115 | second lower cushioning member |
| 210 | truck embodiment |
| 211 | third lower appendage |
| 212 | third upper appendage |
| 214 | third upper cushioning member |
| 215 | third lower cushioning member |

DETAILED DESCRIPTION OF THE PREFERRED EMBODIMENT

The best mode for carrying out the invention is presented in terms of its preferred embodiment, herein depicted within FIGS. 1 through 6 and 9 and in terms of alternate embodiments, herein depicted in FIGS. 7a through 8c and 9. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and that example configurations shall be shown and described for purposes of clarity and disclosure and not by way of limitation of scope.

The terms "a" and "an" herein do not denote a limitation of quantity, but rather denote the presence of at least one of the referenced items.

The present invention describes an eyewear holder (herein described as the "device") 10, which provides a means for holding and securing eyewear 70 via a padded clamping mechanism. The device 10 further comprises a recordable audio message function, at least one (1) lamp 30 which acts as a flashlight, a lens cleansing spray nozzle 52, and a means to attach the device 10 to a sun visor portion 65 of a vehicle 60.

Figure 1:
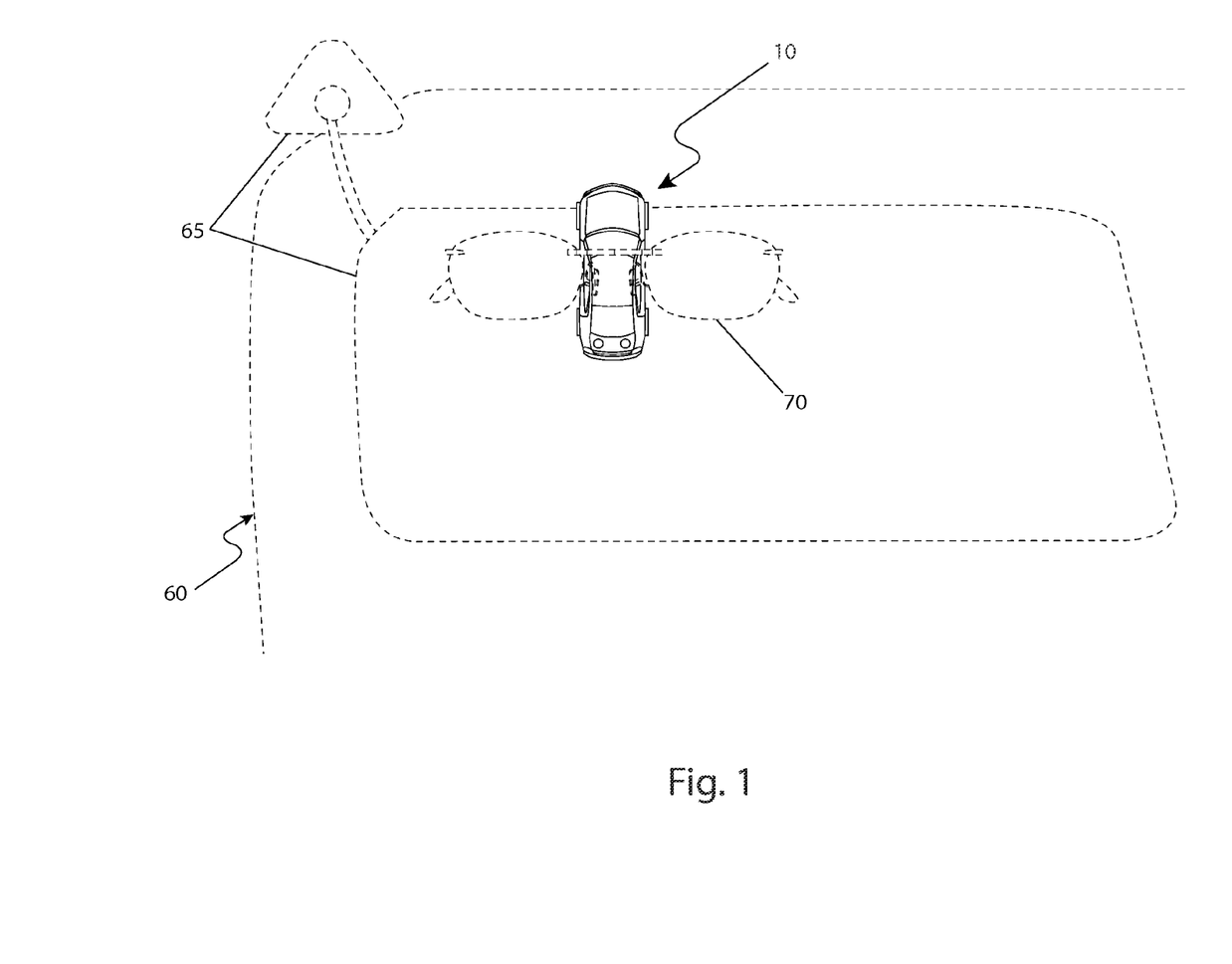
FIG. 1 is an environmental view of an eyewear holder 10 depicting an in-use state, according to a preferred embodiment of the present invention.

Referring now to FIG. 1, an environmental view of the device 10, according to a preferred embodiment of the present invention, is disclosed. The device 10 is depicted here being attached to the inside surface of a common automobile visor 65 via a spring clip fastener 40, thereby providing quick and convenient access to one's eyewear 70. The device 10 may also be attached to an outside surface of the visor 65 or other convenient locations with equal benefit. The device 10 is envisioned to be made from, but not limited to, rigid injection-molded plastic exterior structures having internal first clamping cushioning members 14, 15 which provide protective support for said eyewear 70. The device 10 is depicted here having a racecar motif; however, it is envisioned that the device 10 may be introduced in a variety of unique designs symbolizing a favorite vehicle motif such as those described and illustrated in alternate embodiments (please see FIGS. 7a through 7b).

Figure 2:
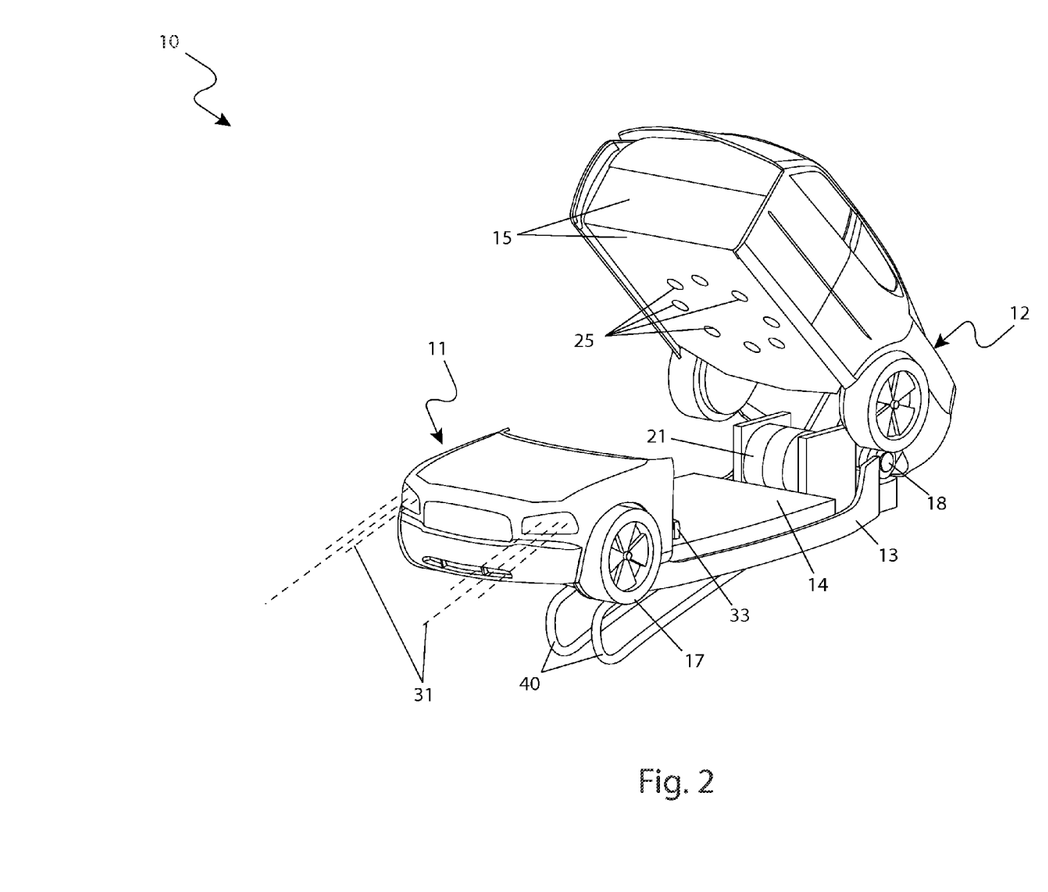
FIG. 2 is a front side perspective view of the eyewear holder 10 in an opened state, according to a preferred embodiment of the present invention.

Referring now to FIG. 2, a front side perspective view of the device 10 in an opened state, according to a preferred embodiment of the present invention, is disclosed. The device 10 comprises a first lower appendage 11, a first upper appendage 12, a first upper cushioning member 14, a first lower cushioning member 15, a pair of rear wheels 16, a pair of front wheels 17, and at least one (1) lamp 30. The first lower appendage 11 and first upper appendage 12 comprise a "clam-shell" type clamping structures being rotatingly connected at a distal end portion via a lateral axial first pivot/hinge 18. Said first lower 11 and first upper 12 appendages are depicted here in a form of a race car; however, various vehicle motifs are envisioned to provide respective unique lower and upper appendages (see FIGS. 7a and 7b). The first lower appendage 11 comprises a likeness of frontal and foundational portions of a vehicle motif including portions such as, but not limited to: a hood, headlights, wheels 16, 17, a bottom chassis 13, and the like. The first upper appendage 12 comprises an upper portion of said vehicle motif such as a roof, trunk lid, and the like. The first lower appendage 11 and first upper appendage 12 include a space between being occupied by a first lower cushioning member 14 and a first upper cushioning member 15, respectively, which provide protective clamping of inserted temple portions of the eyewear 70. The first lower cushioning member 14 and first upper cushioning member 15 are attached to respective first lower appendage 11 and first upper appendage 12 portions using common industrial adhesives and are envisioned to comprise deformable urethane foam rubber or other appropriate compressible materials. Said first cushioning members 14, 15 provide a high-friction surface to secure said eyewear 70 between, when the first appendages 11, 12 are in the closed position to prevent motion during an event of traveling or other means of motion, without causing damage to said eyewear 70. The first cushioning members 14, 15 are shown having generally rectangular shapes; however, said first cushioning members 14, 15 may be introduced having various other contoured shapes which may provide equally effective function such as oval, circular, or any other symmetric or asymmetric shapes, based upon particular first lower 11 and first upper 12 appendage designs. Finally, said first cushioning members 14, 15 provide a protective covering for subjacent electrical and electronic portions of the device 10 including a first speaker 37 and a circuit board 20 (see FIG. 3). The first upper cushioning member 15 is envisioned to comprise a plurality of molded-in speaker apertures 25 to allow efficient transmission of sounds emitted from the aforementioned first speaker 37.

The device 10 comprises a clamped position when the first lower 11 and first upper 12 appendages axially pivot about the hinge/pivot 18 (see FIG. 6), thereby enabling joining and fastening of said first appendages 11, 12 to each other at a non-hinged proximal end via a pair of latching arms 33 and corresponding latching features 34 (see FIG. 5), whereby the first cushioning members 14, 15 are compressed against each other to entrap the eyewear 70.

The device 10 also comprises at least one (1) lamp 30 located along a front surface of the first lower appendage 11 of the device 10, thereby preferably simulating an illuminating 31 function of one (1) or more headlight portions of the vehicle motif. The lamp 30 is powered by replaceable miniature DC batteries being contained within a battery/holder 21 located at an internal rear location within the first lower appendage 11. The lamp 30 is manually activated via a miniature spring-loaded lamp switch 32 being located between the front wheels 17 (see FIG. 6). The lamp 30 preferably comprises a light emitting diode (LED) or equivalent lamp technology. The lamp 30 acts to provide a flashlight function to provide illumination 31 to locate personal objects in the absence of ambient light. It is understood that additional lamps 30 may be located along outer surfaces of the device 10 if desired while utilizing a common power and control circuitry, thereby providing additional illumination 31.

Figure 3:
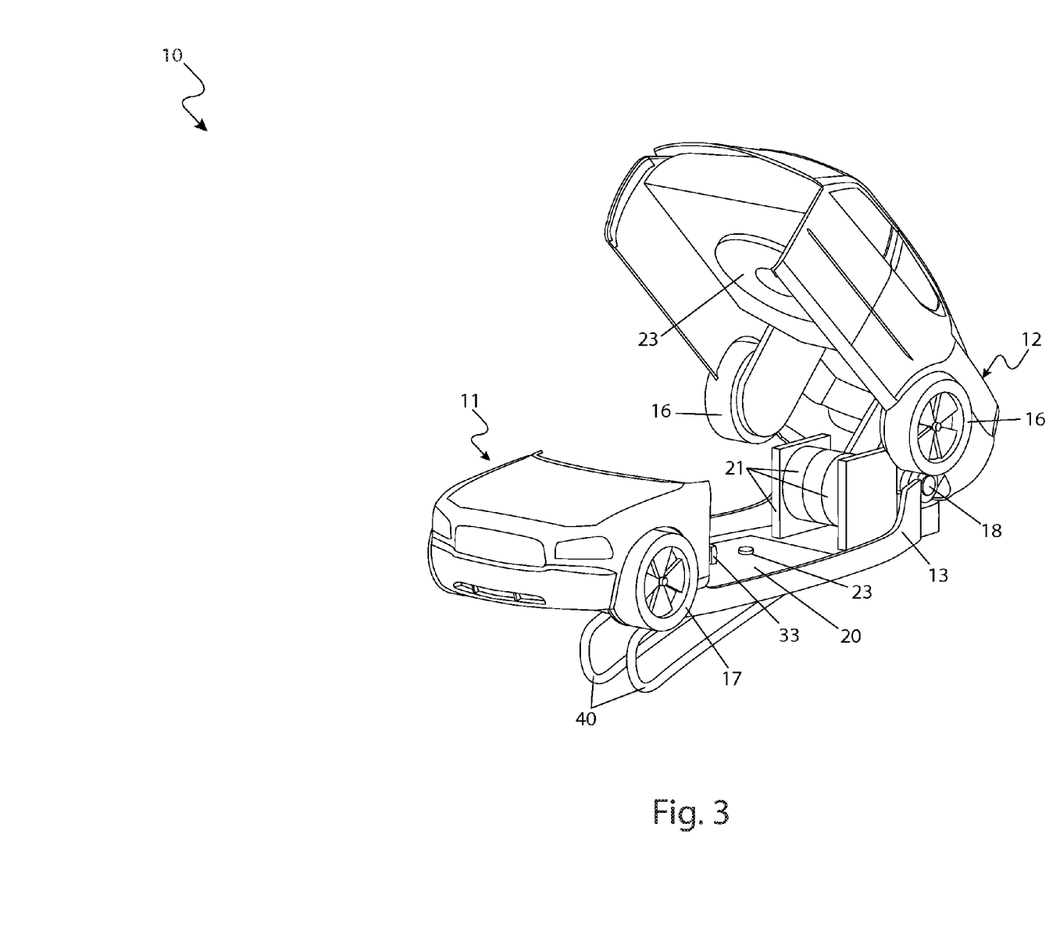
FIG. 3 is a front side perspective view of the eyewear holder 10 depicting removal of first cushioning members 14, 15 for illustration sake, according to a preferred embodiment of the present invention.
Figure 4:
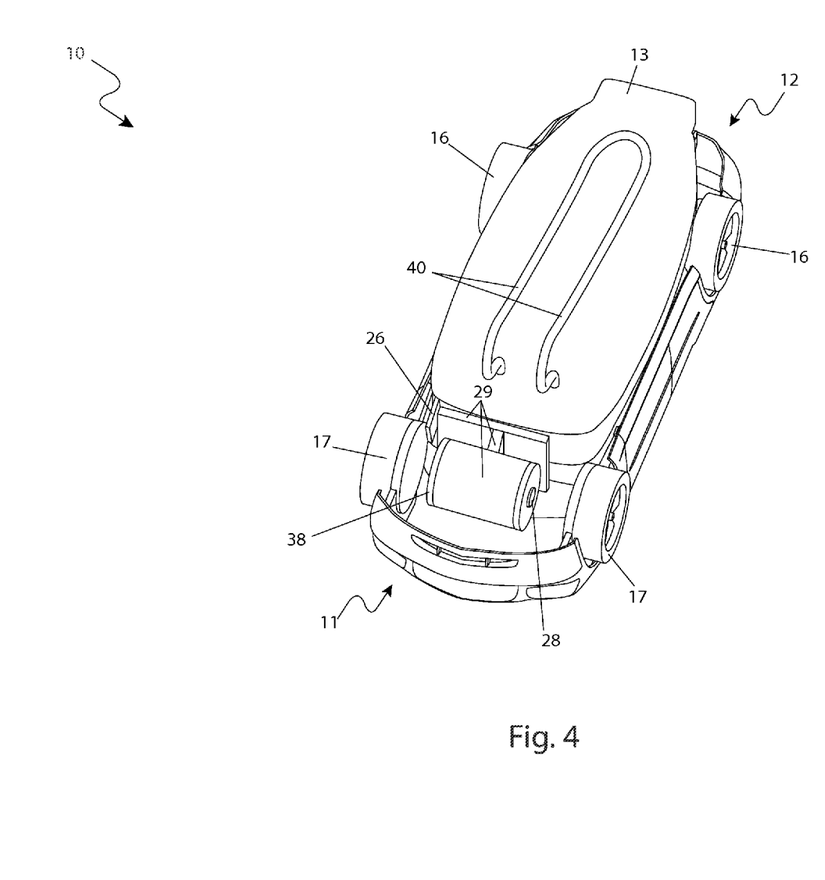
FIG. 4 is a bottom perspective view of the eyewear holder 10, according to a preferred embodiment of the present invention.
Figure 5:
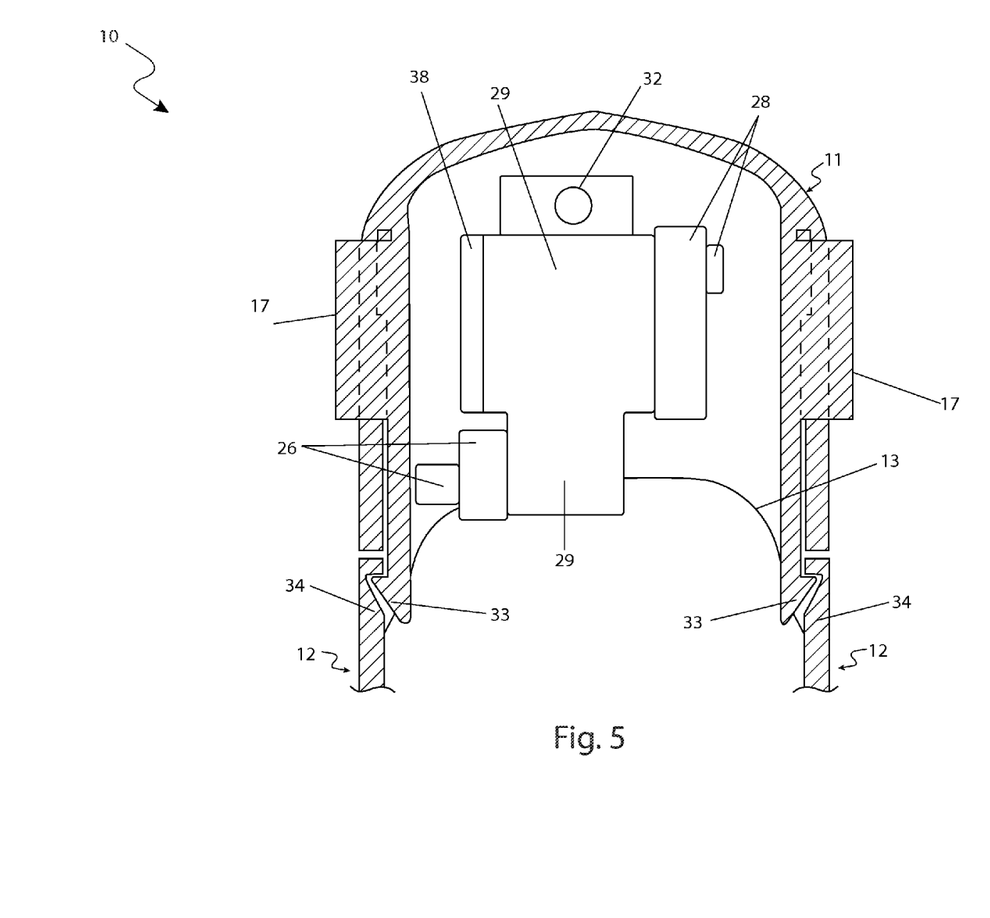
FIG. 5 is a top cut-away view of the eyewear holder 10, according to a preferred embodiment of the present invention.

Referring now to FIGS. 3, 4, and 5, a front side perspective view, a bottom perspective view, and a top cut-away view of the device 10, respectively, according to a preferred embodiment of the present invention, are disclosed. The device 10 is depicted in FIG. 3 with the first cushioning members 14, 15 removed to better illustrate a location of a circuit board 20 and a battery/holder 21. The device 10 also comprises a sound switch 26, a record switch 28, a first speaker 37, and a second speaker 38. The chassis portion 13 of the first lower appendage 11 provides an attachment means to the circuit board 20 along a top surface via conventional methods such as, but not limited to: adhesives, double-face tape, or equivalent fastening means. Said circuit board 20 provides a means to manage power within the device 10 as well as providing a means to generate and broadcast a customizable personal message from the first 37 and second 38 speaker portions of the device 10 being automatically initiated upon detachment of the first lower 11 and first upper 12 appendages by a user. The circuit board 20 comprises electrical and electronic components necessary to record, store, and transmit a recorded personal audio message to the speakers 37, 38. The circuit board 20 is powered by an on-board battery/holder 21 and is envisioned to comprise various electronics such as, but not limited to: microprocessors, embedded software, input/output signal processing capabilities, relays, digital sound processing and storage, and an on-board microphone 23. Upon opening the device 10, a sound switch 26 located between the front wheels 17, initiates a broadcast of a pre-recorded personal message from the first speaker 37 being mounted to the first upper appendage 12, and the second speaker 38 which is mounted to an integrally-molded speaker bracket 29, located between the front wheels 17. Said pre-recorded personal message may be stored by a user within a memory portion of the circuit board 20 via manual activation of a record switch 28 located between the two (2) front wheels 17. Once said personal message is stored within the circuit board 20, said personal message is automatically broadcasted each time the device 10 is opened via coincidental contact with the sound switch 26 which is in mechanical communication with a latching arm portion 33 of the first lower appendage 11.

The first lower appendage 11 comprises a pair of latching arms 33 being correspondingly aligned with latching feature portions 34 of the first upper appendage 12, thereby enabling mechanical latching of the first appendages 11, 12 together. Latching attachment of said first appendages 11, 12 together in a closed state occurs as a user pivots said first appendages 11, 12 about the hinge/pivot 18 to engage said spring-biased male latching arms 33 within the stationary female latching features 34. The latching arms 33 comprise opposing mirror-image "J"-shaped end features which engage the geometrically matched latching features 34, thereby providing a positive snapping closure of the device 10. Each latching arm 33 provides an attachment means to a respective front wheel portion 17 being integrally-molded or affixed along an intermediate outside surface of said latching arms 33. By pressing inwardly upon both front wheels 17 in a coincidental manner, the latching arms 33 are distorted inwardly to mechanically disengage said latching arms 33 from the latching features 34, thereby releasing the first appendages 11, 12 from each other and activating the sound switch 26.

Figure 8A:
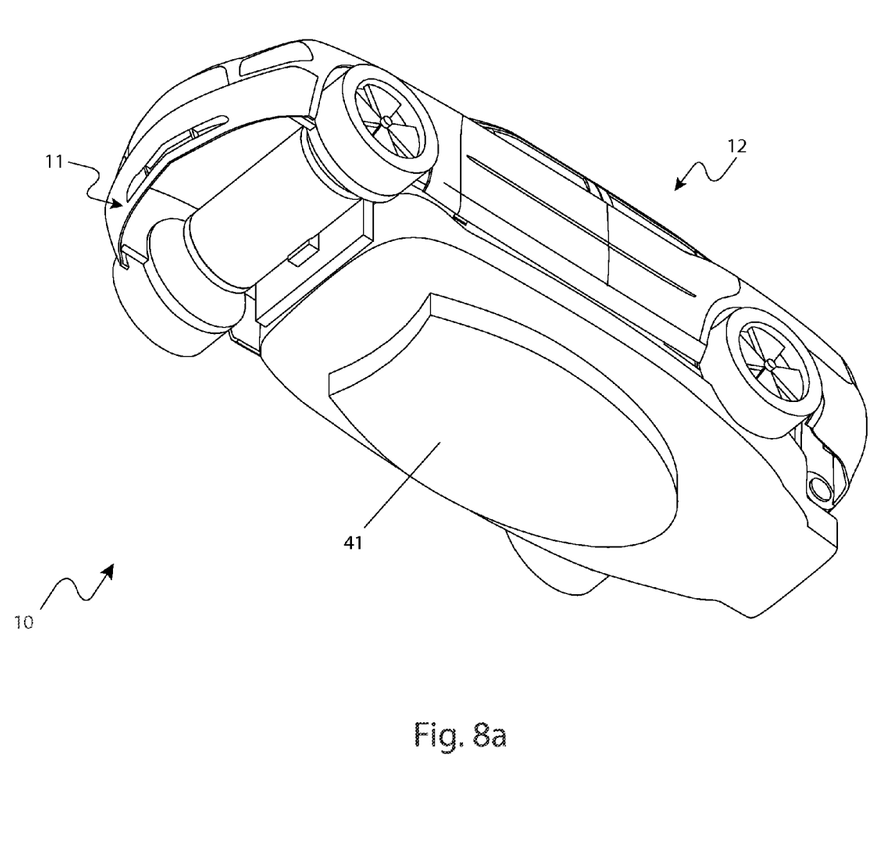
FIG. 8a is a bottom perspective view of the eyewear holder 10 depicting a magnet attachment 41, according to an alternate embodiment of the present invention.
Figure 8B:
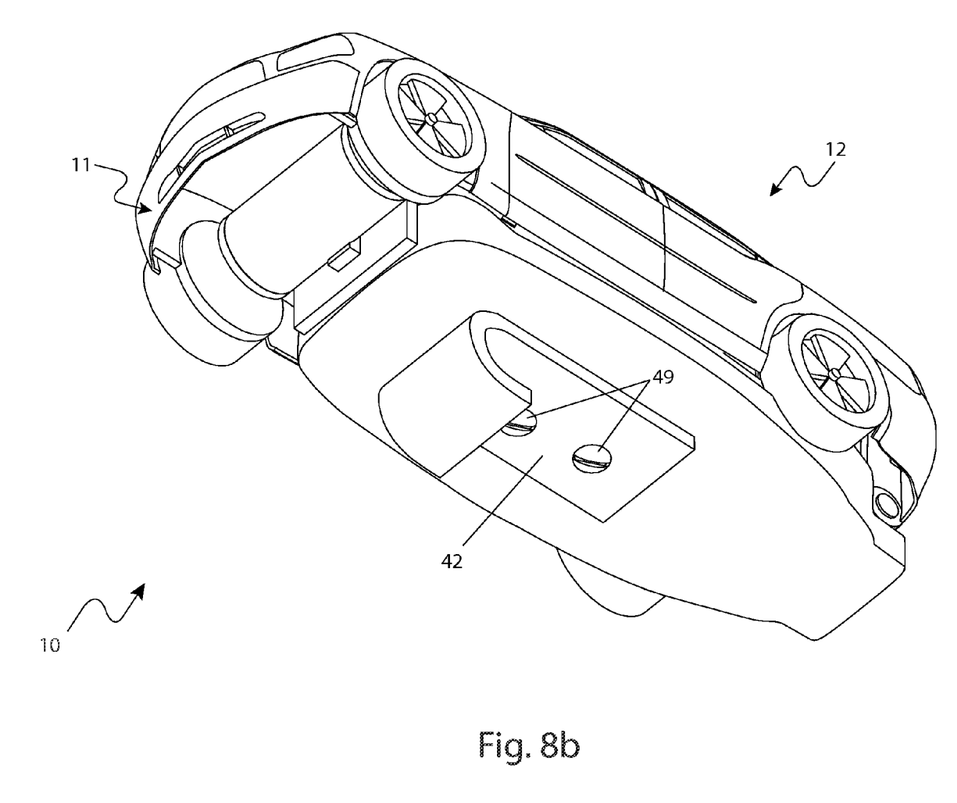
FIG. 8b is a bottom perspective view of the eyewear holder 10 depicting a hook attachment 42, according to an alternate embodiment of the present invention.
Figure 8C:
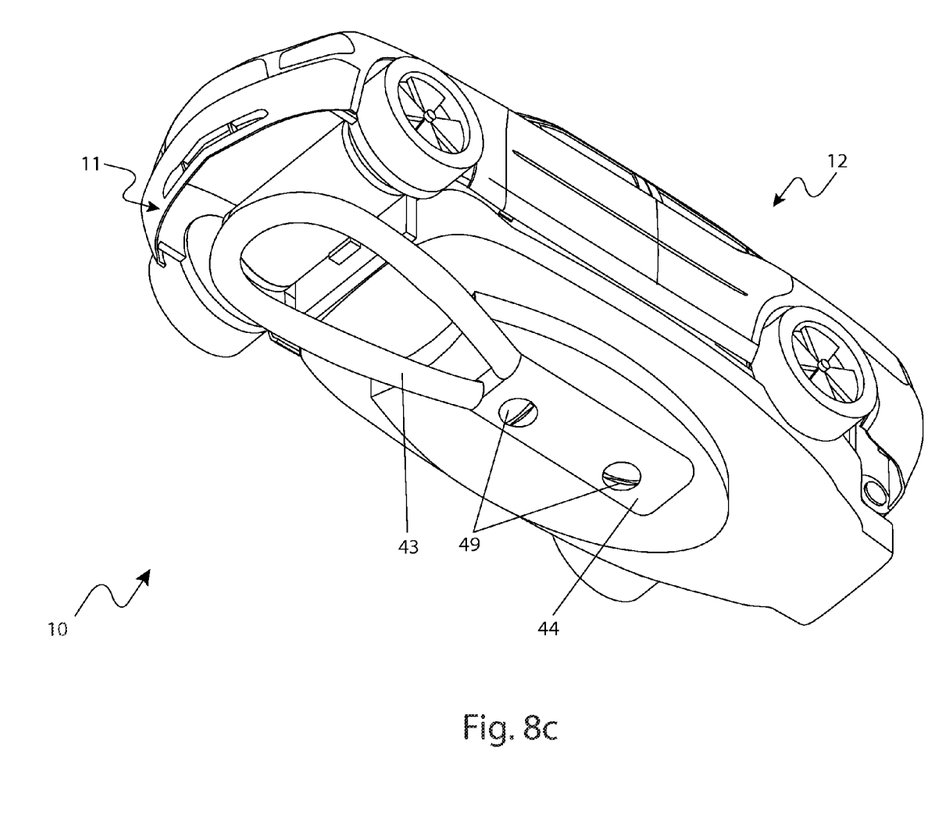
FIG. 8c is a bottom perspective view of the eyewear holder 10 depicting a loop attachment 43, according to an alternate embodiment of the present invention; and, FIG. 9 is an electrical block diagram of the eyewear holder 10, according to a preferred embodiment of the present invention.

The device 10 also comprises a spring clip fastener 40 which provides convenient spring-loaded fastening of the device 10 to a sun visor 65 or other desired appendage. The spring clip fastener 40 is envisioned to be made using spring steel wire stock or other tensioned wire material being integrally molded or otherwise anchored to a bottom surface of the chassis portion 13 of the first lower appendage 11. The spring clip fastener 40 comprises a pair of parallel "S"-shaped clamping wire portions being anchored at a proximal end of the device 10 and joined at a distal end of the device 10. The device 10 may also utilize alternate means of attachment as seen in FIGS. 8a through 8c.

The device 10 further comprises a lamp switch 32 located between the front wheels 17 along a forward bottom surface of the device 10 which provides a means to activate the lamp(s) 30. The lamp switch 32 comprises a miniature push-button component providing manual "push-on/push-off" toggling activation of said lamp(s) 30 by a user as needed.

Figure 6:
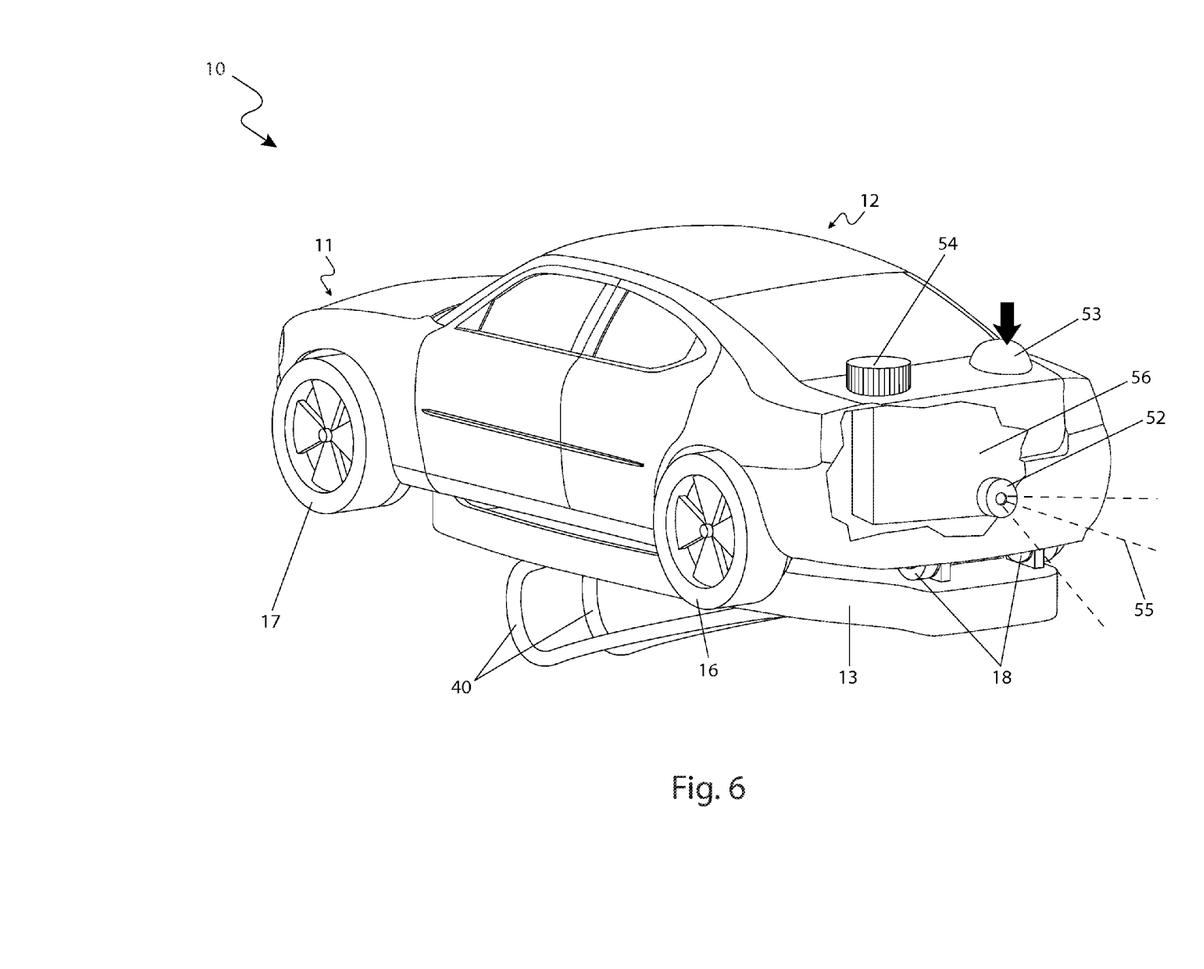
FIG. 6 is a rear side perspective view of the eyewear holder 10, according to a preferred embodiment of the present invention.

Referring now to FIG. 6, a rear side perspective view of the device 10, according to a preferred embodiment of the present invention, is disclosed. The device 10 provides a means to directionally propel a stream of cleansing fluid 55 for a purpose of cleaning one's eyewear 70. The device 10 comprises a nozzle 52, a spray button 53, and a reservoir 56 having a fill cap 54 providing access to the reservoir 56 during filling are located along a trunk area of the vehicle motif of the device 10. The spray button 53 comprises a flexible bulb-type hemisphere-shaped device which collapses when pressed, thereby resulting in an increased internal pressure within the reservoir 37 to propel a stream of cleansing fluid 55 from the nozzle 52. The reservoir 56 is envisioned as being generally rectangular-shaped and contained within a trunk area of the vehicle motif.

The first pivot/hinge 18 comprises a single-axis type rotating connection between the first upper appendage 12 and the first lower appendage 11 being between or adjacent to the rear wheels 16. Said first pivot/hinge 18 is envisioned to be made using interconnecting plastic injection molded features, a metal axle, or the like.

Figure 7A:
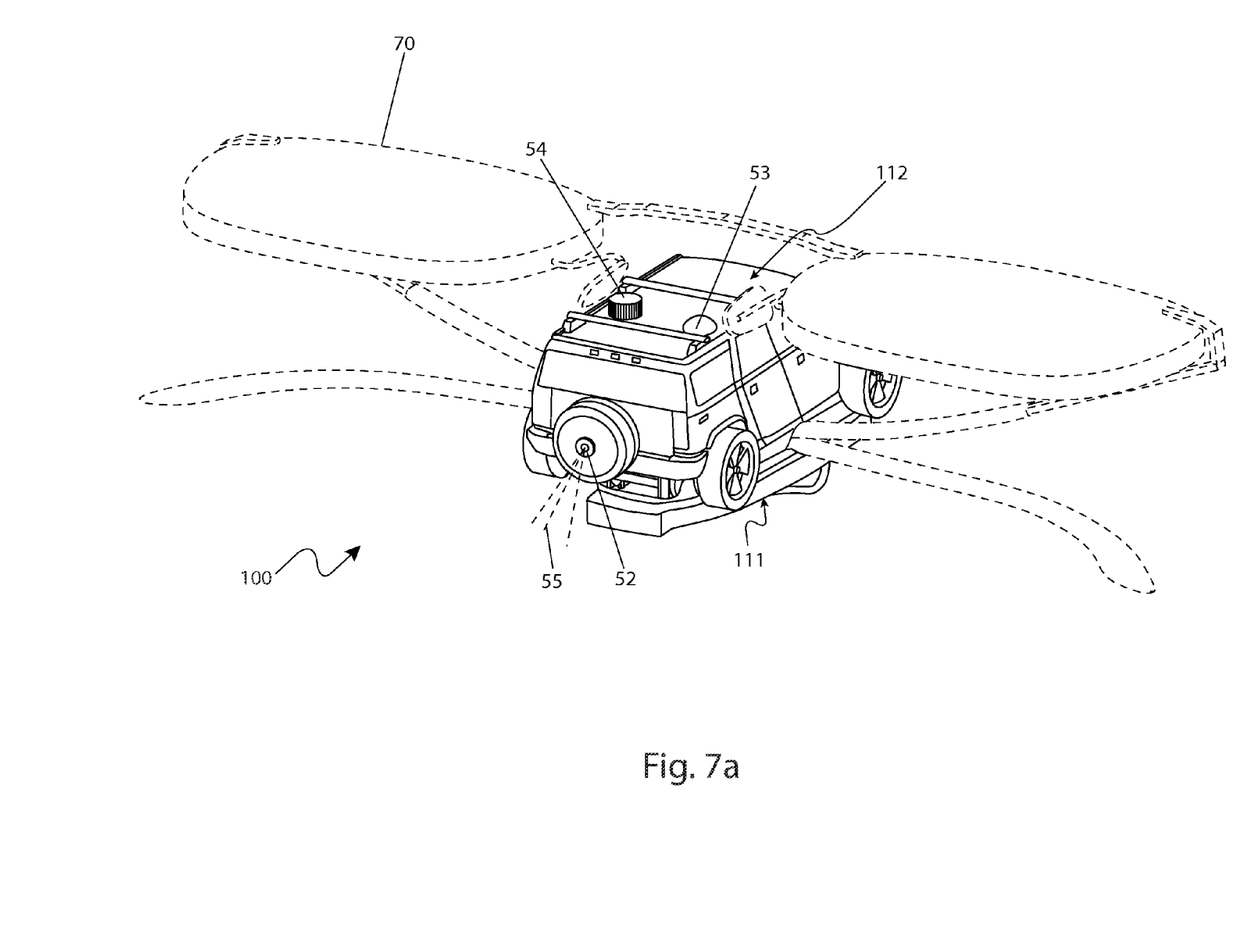
FIG. 7a is a perspective view of the eyewear holder 10 depicting a tanker truck motif, according to an alternate embodiment of the present invention.
Figure 7B:
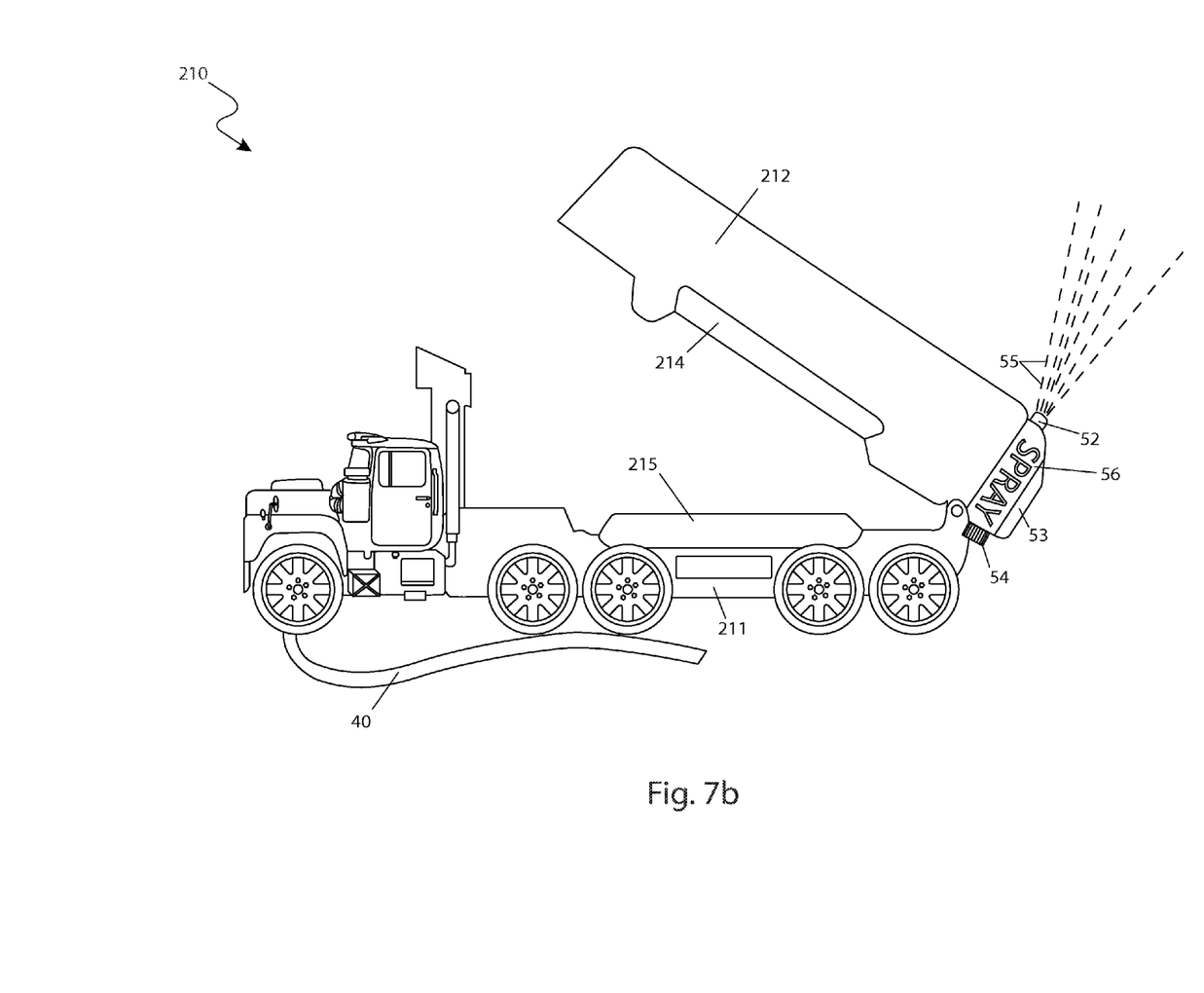
FIG. 7b is a perspective view of the eyewear holder 10 depicting a sport utility vehicle (SUV) automobile motif, according to an alternate embodiment of the present invention.

Referring now to FIGS. 7a and 7b, perspective views of the device 10 depicting an SUV motif embodiment 100 and a tanker truck motif embodiment 210, according to alternate embodiments of the present invention, are disclosed. The SUV motif embodiment 100 is depicted here comprising respective portions including a second lower appendage 111, a second upper appendage 112, a second upper cushioning member 114, and a second lower cushioning member 115. Likewise, the tanker truck motif embodiment 210 is depicted here comprising respective portions including a third lower appendage 211, a third upper appendage 212, a third upper cushioning member 214, and a third lower cushioning member 215.

It is envisioned that all of the functional features of the preferred embodiment 10 described in FIGS. 2 through 6 may be incorporated into said alternate vehicle motifs 100, 210, being arranged in similar locations and forms as the preferred embodiment 10.

Referring now to FIGS. 8a, 8b, and 8c, bottom perspective views of the device 10 depicting other temporary or permanent attachment means for the device 10, according to alternate embodiments of the present invention, are disclosed. The device 10 may be introduced having various alternate attaching features along a bottom surface of the chassis portion 13 including a permanent magnet 41, a metal or plastic hook 42, and a plastic or fabric loop 43.

The permanent magnet 41 comprises a single flat magnet being attached to the chassis portion 13 in a parallel manner via at least two (2) fasteners 49.

The hook 42 attachment means comprises a "J"-shaped appendage also affixed to the chassis 13 using at least two (2) fasteners 49.

The loop 43 attachment means comprises a length of cord or tubing with end portions being joined using a tubular connector portion 44 which in turn is affixed to the chassis 13 using at least two (2) fasteners 49.

The alternate attachment means 8a, 8b, 8c enable secure attachment of the device 10 to such surfaces and appendages as, but not limited to: refrigerators, knobs, walls, or the like. It is understood that the embodiments shown here act as examples, and that numerous additional attachment methods may provide added attachment capability.

Figure 9:
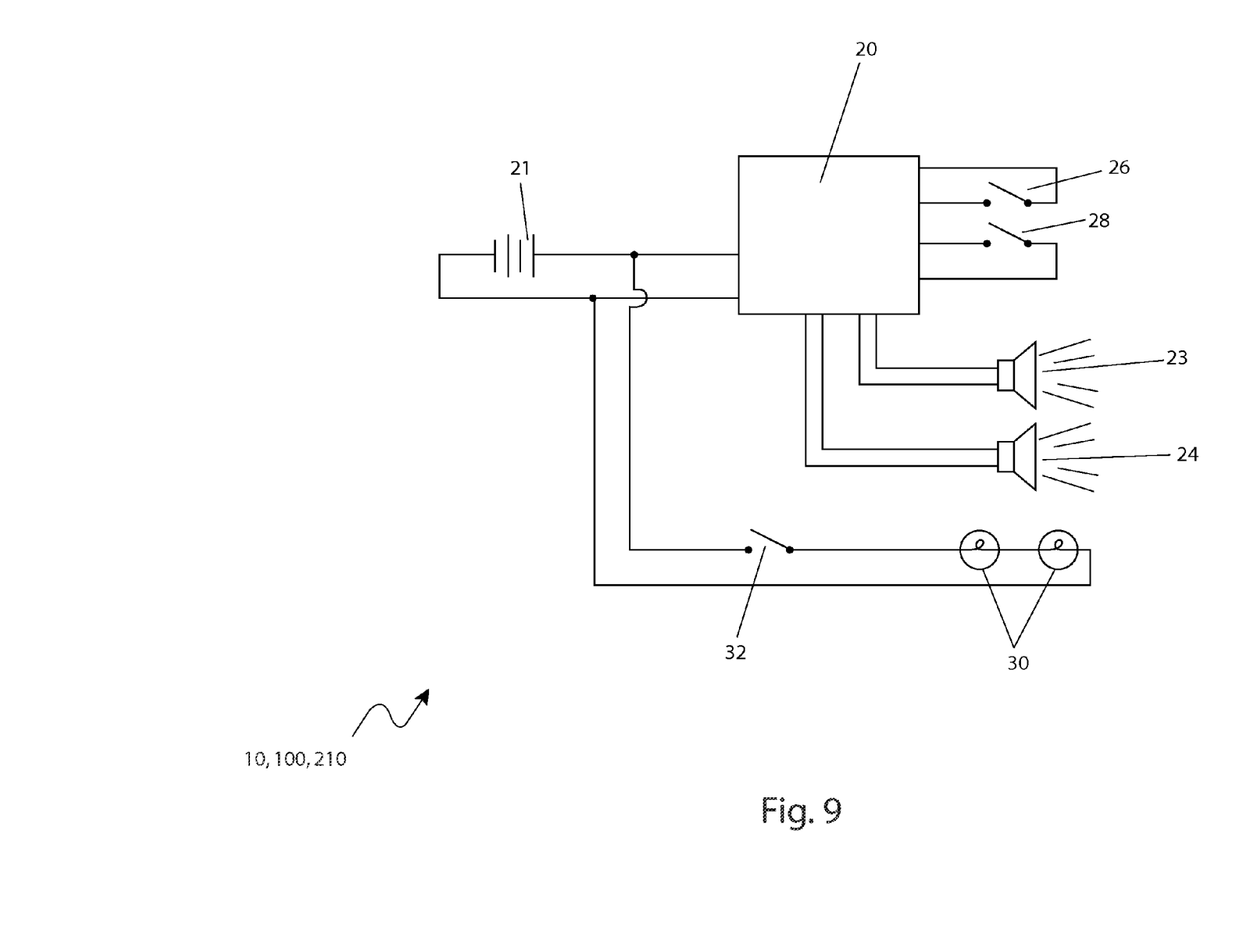

Referring now to FIG. 9, an electrical block diagram of the device 10, according to a preferred embodiment of the present invention, is disclosed. The device 10 receives DC power from one (1) or more replaceable batteries within the battery/holder 21. Power is then conducted to a miniature toggle-type pushbutton lamp switch 32 and in turn to the lamp(s) 30. The lamp 30 preferably utilizes LED lamp technology; however, incandescent devices or equivalent technology may be provided. Power from the battery/holder 21 is also conducted to the circuit board 20 which in turn conducts the pre-recorded personal message to the first 37 and second 38 speakers based upon embedded software instructions and received signals from the sound 26 and record 28 switches. The circuit board 20 is capable of digital sound processing and storage and receives sound data from an on-board microphone 23.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of utilizing each decorative embodiment may be achieved by performing the following steps: procuring a model of the device having a desired vehicle motif 10, 100, 210, color, and other features; inserting a fresh set of batteries into the battery/holder 21; attaching the device 10, 100, 210 to a sun visor 65 by utilizing the flexible spring clip fastener 40; pressing both front wheels 17 inwardly to release the first upper appendage 12 outwardly from the first lower appendage 11, thereby opening the device 10, 100, 210, and automatically and coincidentally pressing the sound switch 26 to initiate broadcast of the pre-recorded message from the speakers 37, 38; inserting temple portions of one's eyewear 70 between the first cushioning members 14, 15; utilizing the first pivot/hinge 18 to pivot the first lower appendage 11 against the first upper appendage 12; latching the first appendages 11, 12 together via latching engagement of the latching arms 33 and latching features 34; securing said eyewear 70 within the device 10, 100, 210 until needed for use; removing the eyewear 70 from the device 10, 100, 210 as needed by depressing the front wheels 17; and, benefiting from attractive and protective securement of one's eyewear 70 afforded a user of the present invention 10, 100, 210.

The method of utilizing the lamp(s) 30 as a flashlight device is accomplished as follows: pressing and releasing the lamp switch 32 to activate the lamp(s) 30; utilizing said lamp(s) 30 as a flashlight device as needed to locate personal items during an absence of sufficient ambient light; and, pressing and releasing the lamp switch 32 again to deactivate the lamp(s) 30.

The method of utilizing the lens spray nozzle 52 is accomplished as follows: removing the fill cap 54; filling the reservoir 56 with cleansing fluid 55; replacing the fill cap 54; depressing the spray button 53 inwardly; expelling a stream of cleansing fluid 55 from the nozzle 52 onto a lens portion of one's eyewear 70; cleaning said eyewear 70 of collected dust, dirt, and/or other grime in a conventional manner.

The method of recording a pre-recorded personal audio message into each device 10, 100, 210 is accomplished as follows: manually pressing and holding the record switch 28 to initiate a recording interval; speaking into, or exposing the microphone portion 23 of the circuit board 20 to a desired sound to be recorded; and, releasing the record switch 28 to end the recording process.

The alternate attachment means of each device 10, 100, 210 including the permanent magnet 41, the metal or plastic hook 42, and the plastic or fabric loop 43 may be incorporated into various designs of the device 10, 100, 210 and utilized to affix the device 10, 100, 210 to another type of sun visors 65, a belt, a dashboard, a motorcycle windshield, a refrigerator, a shirt pocket, and the like.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An eyewear holder, comprising:
   a portable body simulating a vehicle;
   a clamping mechanism operably coupled to said body for holding said eyewear at a substantially stable position, further comprising:
   an upper appendage and a lower appendage pivotally connected thereto, said upper and lower appendages defining a cavity therebetween when pivoted to an open position for receiving said eyewear therein;
   an upper cushioning member and a lower cushioning member directly attached to said upper and lower appendages respectively;
   a hinge member situated at a distal end of said body such that said upper and lower appendages rotate about a fulcrum axis defined orthogonal to a longitudinal length of said body; and,
   a pair of clasping release arms formed at a proximal end of said body and suitably located therealong such that proximal faces of said upper and lower appendages engage and lock together when said upper and lower appendages are pivoted to a closed position, said upper and lower cushioning members being vertically stacked and engaged when said pair of clasping release arms are adapted to a locked position;

an audio system connected to said body, having a pre-recorded audio signal stored therein;
a lighting system connected to said body;
an electronic control means for operably controlling and in electrical communication with said audio system and said lighting system;
a cleansing spray mechanism connected to said body; and,
a means for connecting said body to a support structure;
wherein said audio system is mechanically connected to one of said pair of clasping release arms, such that said pre-recorded audio signal plays back when said holder is in said open position;
wherein said audio system selectively plays back said pre-recorded audio signal;
wherein said lighting system emits illumination outward from said body; and,
wherein said cleansing spray mechanism is fillable with a cleansing liquid.

2. The holder of claim 1, wherein each of said pair of clasping release arms are operably and mechanically attached to each of a pair of front wheels of said body.

3. The holder of claim 1, wherein said audio system further comprises:
a sound switch in electrical communication with said electronic control means and operably controlled by said clamping mechanism; and,
at least one speaker mounted to an inner surface of said body;
wherein said sound switch is activated when said holder is at said open position.

4. The holder of claim 3, wherein said at least one speaker is mounted to either or both of said roof of said upper appendage underneath said upper cushion member, and between said pair of front wheels of an interior of said lower appendage.

5. The holder of claim 1, wherein said lighting system comprises:
a plurality of lights located along a predetermined location of said body; and,
a light switch in electrical communication with said electronic control means and located between said pair of front wheels of an interior of said lower appendage;
wherein said plurality of lights emits illumination when said light switch is activated.

6. The holder of claim 1, wherein said electronic control means further comprises:
at least one battery contained within said battery compartment and electrically coupled to said pair of lights; and,
a circuit board mounted to an interior of said lower appendage of said body and in electrical communication with said at least one battery;
wherein said circuit board stores said pre-recorded audio signal and transmits said pre-recorded audio signal to said at least one speaker when said holder is on said open position;
wherein said at least one battery provides power to said circuit board, said audio system and said lighting system.

7. The holder of claim 1, wherein said cleansing spray mechanism comprises:
a reservoir mounted to a rear portion of said body, said reservoir being provided with a fill cap disposed at an end thereof;
a nozzle in fluid communication with said reservoir;
a spray button in fluid communication with said reservoir and extending outward from said body;
wherein said spray button when depressed dispenses an amount of said cleansing liquid from said reservoir through said nozzle.

8. The holder of claim 1, wherein said connecting means comprises one of the following devices: a clip removably attached to said lower appendage member, a permanent magnet removably attached to said lower appendage member, a hook removably attached to said lower appendage member, and a loop attached to a tubular connector removably attached to said lower appendage member.

9. The holder of claim 1, wherein said portable body further comprises a vehicular motif of one of the following: a NASCAR-style car, a tanker trailer, or an SUV.

10. An eyewear holder comprising:
a portable body simulating a vehicle;
a clamping mechanism operably coupled to said body for holding said eyewear at a substantially stable position, further comprising:
an upper appendage and a lower appendage pivotally connected thereto, said upper and lower appendages defining a cavity therebetween when pivoted to an open position for receiving said eyewear therein;
an upper cushioning member and a lower cushioning member directly attached to said upper and lower appendages respectively;
a hinge member situated at a distal end of said body such that said upper and lower appendages rotate about a fulcrum axis defined orthogonal to a longitudinal length of said body; and,
a pair of clasping release arms formed at a proximal end of said body and suitably located therealong such that proximal faces of said upper and lower appendages engage and lock together when said upper and lower appendages are pivoted to a closed position, said upper and lower cushioning members being vertically stacked and engaged when said pair of clasping release arms are adapted to a locked position;
an audio system connected to said body, having a pre-recorded audio signal stored therein, further having a recordable function for recording an audio signal;
a lighting system connected to said body;
an electronic control means for operably controlling and in electrical communication with said audio system and said lighting system;
a cleansing spray mechanism connected to said body; and,
a means for connecting said body to a support structure;
wherein said audio system is mechanically connected to one of said pair of clasping release arms, such that said pre-recorded audio signal or said recorded audio signal plays back when said holder is in said open position;
wherein said audio system selectively plays back said pre-recorded audio signal or said recorded audio signal;
wherein said lighting system emits illumination outward from said body; and,
wherein said cleansing spray mechanism is fillable with a cleansing liquid.

11. The holder of claim 10, wherein each of said pair of clasping release arms are operably and mechanically attached to each of a pair of front wheels of said body.

12. The holder of claim 10, wherein said audio system further comprises:
a sound switch in electrical communication with said electronic control means and operably controlled by said clamping mechanism;
a microphone in electrical communication with said electronic control means;

a recording switch in electrical communication with said electronic control means and located within said body; and, at least one speaker mounted to an inner surface of said body;

wherein said sound switch is activated when said holder is at said open position; and, wherein said recording switch is selectively activated to enable said recorded signal to be captured by said microphone.

13. The holder of claim 12, wherein said at least one speaker is mounted to either or both of said roof of said upper appendage underneath said upper cushion member, and between said pair of front wheels of an interior of said lower appendage.

14. The holder of claim 10, wherein said lighting system comprises:

a plurality of lights located along a predetermined location of said body; and, a light switch in electrical communication with said electronic control means and located between said pair of front wheels of an interior of said lower appendage;

wherein said plurality of lights emits illumination when said light switch is activated.

15. The holder of claim 10, wherein said electronic control means further comprises:

at least one battery contained within said battery compartment and electrically coupled to said pair of lights; and, a circuit board mounted to an interior of said lower appendage of said body and in electrical communication with said at least one battery;

wherein said circuit board stores said pre-recorded audio signal and transmits said pre-recorded audio signal to said at least one speaker when said holder is on said open position;

wherein said circuit board stores said recorded audio signal and transmits said recorded audio signal to said at least one speaker when said holder is on said open position and said recording switch is activated;

wherein said at least one battery provides power to said circuit board, said audio system and said lighting system.

16. The holder of claim 10, wherein said cleansing spray mechanism comprises:

a reservoir mounted to a rear portion of said body, said reservoir being provided with a fill cap disposed at an end thereof;

a nozzle in fluid communication with said reservoir;

a spray button in fluid communication with said reservoir and extending outward from said body;

wherein said spray button when depressed dispenses an amount of said cleansing liquid from said reservoir through said nozzle.

17. The holder of claim 10, wherein said connecting means comprises one of the following devices: a clip removably attached to said lower appendage member, a permanent magnet removably attached to said lower appendage member, a hook removably attached to said lower appendage member, and a loop attached to a tubular connector removably attached to said lower appendage member.

18. The holder of claim 10, wherein said portable body further comprises a vehicular motif of one of the following: a NASCAR-style car, a tanker trailer, or an SUV.

* * * * *